(12) United States Patent
Honda et al.

(10) Patent No.: US 11,840,978 B2
(45) Date of Patent: Dec. 12, 2023

(54) ENGINE SYSTEM AND GAS FUEL COMBUSTION METHOD

(71) Applicant: Yanmar Holdings Co., Ltd., Osaka (JP)

(72) Inventors: Yusuke Honda, Osaka (JP); Kazuteru Toshinaga, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 17/949,567

(22) Filed: Sep. 21, 2022

(65) Prior Publication Data

US 2023/0088765 A1  Mar. 23, 2023

(30) Foreign Application Priority Data

Sep. 21, 2021  (JP) ................................. 2021-153066

(51) Int. Cl.
*F02D 41/40* (2006.01)
*F02D 41/00* (2006.01)
*F02D 41/30* (2006.01)

(52) U.S. Cl.
CPC ....... *F02D 41/401* (2013.01); *F02D 41/0027* (2013.01); *F02D 41/3047* (2013.01); *F02D 2200/10* (2013.01)

(58) Field of Classification Search
CPC ............... F02D 41/401; F02D 41/0027; F02D 41/3047; F02D 2200/10; F02D 19/0644; F02D 19/0647; F02D 35/023; F02D 41/146; F02D 41/1462; F02D 19/10; F02D 41/405; Y02T 10/30

See application file for complete search history.

(56) References Cited

U.S. PATENT DOCUMENTS

| 10,823,106 B1* | 11/2020 | John ...................... F02D 41/403 |
| 2021/0404371 A1* | 12/2021 | Yerace ................ F02D 41/1497 |
| 2021/0404372 A1* | 12/2021 | Klingbeil ................ F02D 29/02 |

FOREIGN PATENT DOCUMENTS

| JP | 2012-532273 A | 12/2012 |
| JP | 2020143577 A * | 9/2020 |

* cited by examiner

*Primary Examiner* — Joseph J Dallo
(74) *Attorney, Agent, or Firm* — NORTON ROSE FULBRIGHT US LLP

(57) ABSTRACT

The present disclosure describes an engine system that can achieve at least one of the followings: suppressing of generating of nitrogen oxides and suppressing of remaining of uncombusted hydrocarbons. The engine system has a combustion chamber to which air and a gas fuel are supplied, and is configured to combust the gas fuel. The engine system includes a liquid fuel injecting unit, and a control unit. The liquid fuel injecting unit is configured to inject a liquid fuel thereby to ignite the gas fuel. The control unit is configured to control the liquid fuel injecting unit. The control unit is configured to control the liquid fuel injecting unit so that injection of the liquid fuel is performed after a flame propagation after ignition of the gas fuel is ended.

20 Claims, 10 Drawing Sheets

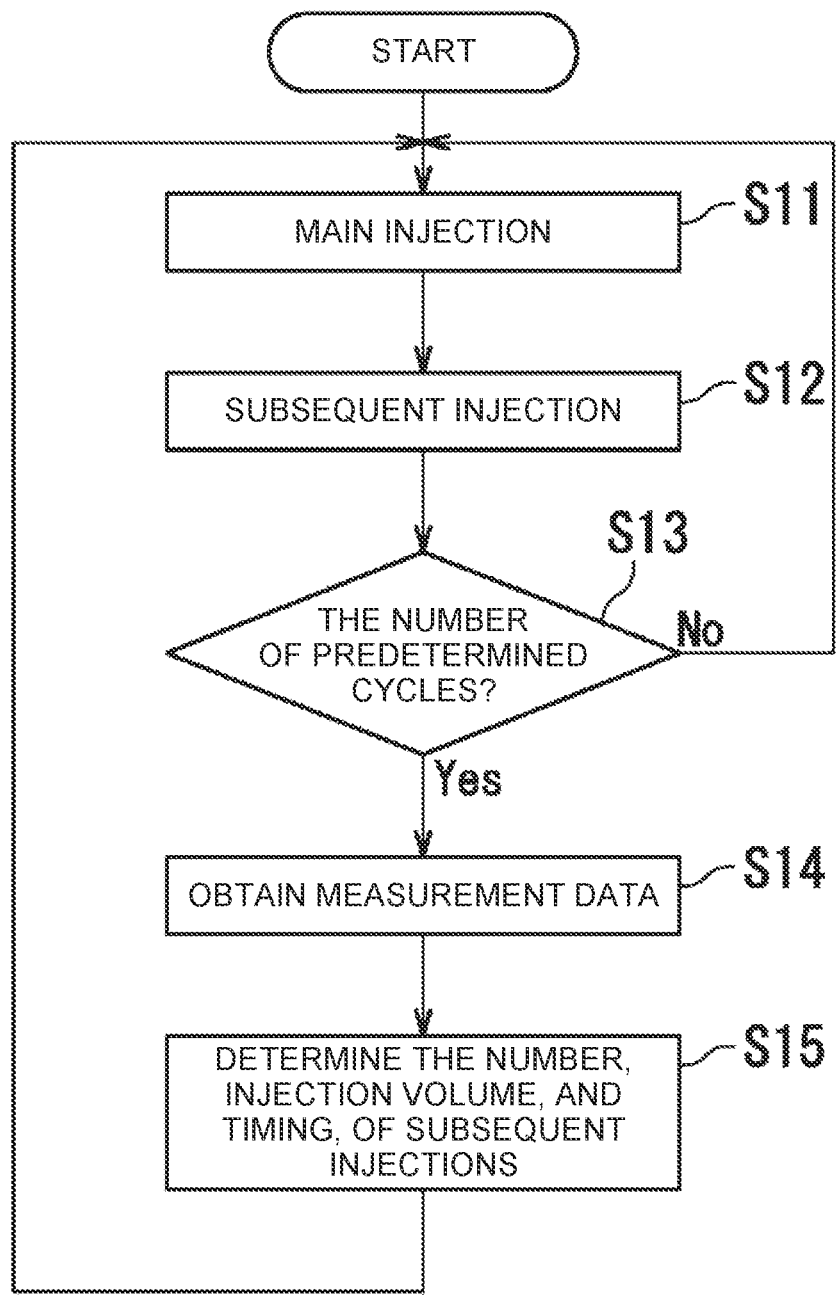

ENGINE SYSTEM AND GAS FUEL COMBUSTION METHOD

CROSS-REFERENCE TO RELATED APPLICATIONS

This application claims priority under 35 U.S.C. § 119 to JP Application No. 2021-153066 filed Sep. 21, 2021, the entire contents of which are hereby incorporated by reference.

TECHNICAL FIELD

The present invention relates to an engine system and a gas fuel combustion method.

BACKGROUND ART

The internal combustion engine operating method described in Patent Document 1 operates a diesel-type dual-fuel internal combustion engine. An internal combustion engine includes a combustion chamber, a first fuel supply unit for a first fuel, and a second fuel supply unit for a second fuel. The internal combustion engine operating method includes steps 1 through 4.

In the first step, the first fuel is premixed in the combustion chamber. In the second step, a charge material containing the first fuel is compressed to a condition that allows the second fuel to auto-ignite. In the third step, a first injection of the second fuel into the combustion chamber is performed to start the auto-ignition of the second fuel, thereby igniting the first fuel. This starts the condition for premixed flame propagation combustion of the first fuel. In the fourth step, at least one subsequent injection is performed, but the subsequent injection provides an additional kinetic energy to a combustion step.

PRIOR ART DOCUMENT

Patent Document

Patent Document 1: Japanese Unexamined Patent Application Publication No. 2012-532273

SUMMARY OF INVENTION

Technical Problem

However, the internal combustion engine operating method described in Patent Document 1 performs the subsequent injection so as to increase the flame propagation rate. Increasing the flame propagation rate increases the combustion rate, resulting in a higher maximum temperature during combustion. As a result, the generated volume of nitrogen oxides increases during the combustion of the first fuel. In addition, uncombusted hydrocarbons are, as the case may be, generated during the combustion of the first fuel.

The present invention has been made in view of the above problem, and an object thereof is to provide an engine system and a gas fuel combustion method that can achieve at least one of the followings when combusting gas fuel: suppressing of generating of nitrogen oxides and suppressing of remaining of uncombusted hydrocarbons.

Solution to Problem

According to one aspect of the present invention, an engine system has a combustion chamber to which air and a gas fuel are supplied, and combusts the gas fuel. The engine system includes a liquid fuel injecting unit, and a control unit. The liquid fuel injecting unit injects a liquid fuel thereby to ignite the gas fuel. The control unit controls the liquid fuel injecting unit. The control unit controls the liquid fuel injecting unit so that the injecting of the liquid fuel is performed after a flame propagation after the igniting of the gas fuel is ended.

According to another aspect of the present invention, a gas fuel combustion method in an engine in which air and a gas fuel are supplied to a combustion chamber thereby to combust the gas fuel includes: a step of injecting a liquid fuel thereby to ignite the gas fuel; and a step of performing an injecting of the liquid fuel after a flame propagation after the igniting of the gas fuel is ended.

Advantageous Effects of Invention

The present invention can provide an engine system and a gas fuel combustion method that can achieve at least one of the followings when combusting gas fuel: suppressing of generating of nitrogen oxides and suppressing of remaining of uncombusted hydrocarbons.

BRIEF DESCRIPTION OF DRAWINGS

FIG. 9 is a flowchart showing the gas fuel combustion method according to a modified example of the present embodiment.

DESCRIPTION OF EMBODIMENTS

Figure 1:
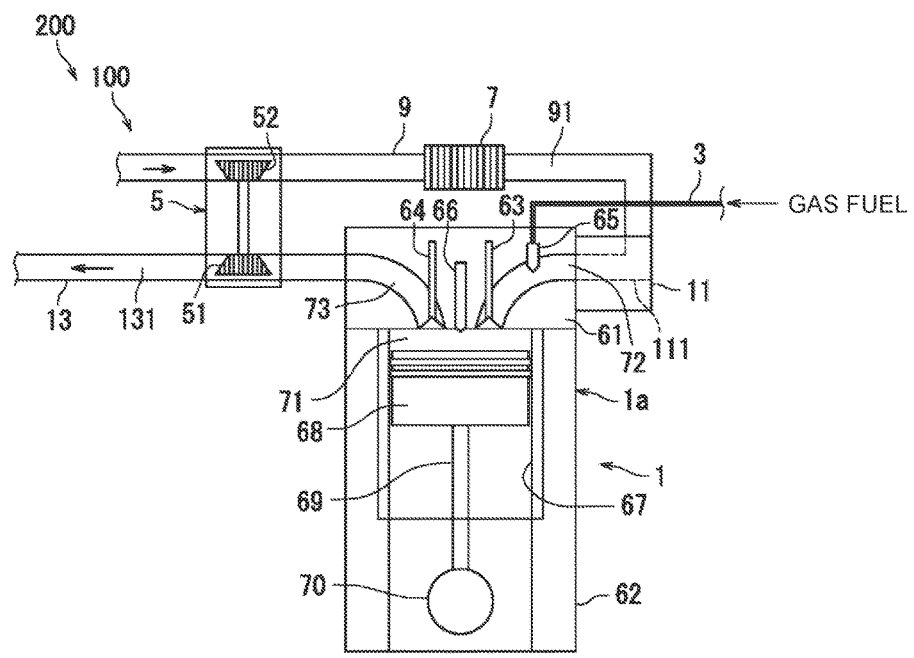
FIG. 1 is a schematic diagram showing a configuration of an engine system according to an embodiment of the present invention.

An embodiment of the present invention will be described hereinafter with reference to the accompanying drawings. Note that, in the drawings, the same reference signs are used for the same or equivalent components, and repeated descriptions are omitted.

Referring to FIGS. 1 through 8, an engine system 100 of the embodiment of the present invention is described. First, the engine system 100 is described with reference to FIG. 1. FIG. 1 is a schematic diagram showing a configuration of the engine system 100. The engine system 100 shown in FIG. 1 combusts a gas fuel. Specifically, the engine system 100 combusts the gas fuel thereby to obtain mechanical work. The gas fuel is not particularly limited, examples thereof including hydrogen, ammonia, or natural gas. Natural gas is, for example, vaporized liquefied natural gas (LNG). The engine system 100 is, for example, mounted in a vehicle, installed in a building, or installed outdoors. Vehicles are, for example, vessels, automobiles, railcars, or airplanes.

The following is an example of a vessel 200 as a vehicle in which the engine system 100 is installed. In the present specification, the vessel 200 may be read as "vehicle".

As shown in FIG. 1, the vessel 200 is equipped with the engine system 100. The engine system 100 includes an engine 1, a gas fuel supply pipe 3, a supercharger 5, an intercooler 7, an air supply pipe 9, an air supply manifold 11, and an exhaust pipe 13.

The engine 1 combusts the gas fuel. Specifically, the engine 1 combusts the gas fuel thereby to obtain mechanical work. The engine 1 is, for example, a four-step engine. The engine 1 performs the combustion cycle repeatedly. The combustion cycle includes an intake stroke, a compression stroke, a combustion stroke, and an exhaust stroke. The engine 1 is, for example, an engine for propelling the vessel 200 or for driving a generator.

The gas fuel supply pipe 3 supplies the gas fuel to the engine 1. The air supply pipe 9 provides air from outside the engine 1 through the supercharger 5, the intercooler 7, and the air supply manifold 11 to the engine 1. In other words, the air supply pipe 9 has an air supply passage 91. The air then flows through the air supply passage 91 and the air is supplied to the engine 1.

Specifically, the supercharger 5 and the intercooler 7 are arranged in this order, from upstream to downstream of the air supply. To the engine 1, the supercharger 5 supplies air with a pressure greater than atmospheric pressure. Specifically, the supercharger 5 compresses the air flowing through the air supply pipe 9, and the air with a pressure greater than atmospheric pressure flows into the air supply pipe 9. Hereinafter, "compressed air" shows air at a pressure greater than atmospheric pressure.

The intercooler 7 cools the air compressed by the supercharger 5 and supplies the cooled air to the air supply manifold 11. The air supply manifold 11 supplies the compressed and cooled air to the engine 1. In other words, the air supply manifold 11 has an air supply passage 111. The compressed and cooled air is then supplied to the engine 1 via the air supply passage 111. Specifically, the engine 1 has a plurality of cylinders 1a. FIG. 1 shows one cylinder 1a for simplicity of drawing. The air supply manifold 11 then supplies the compressed and cooled air to each cylinder 1a. The engine 1 may have one cylinder 1a. In this case, the air supply manifold 11 can be omitted.

Exhaust gas discharged from the engine 1 flows into the exhaust pipe 13. In other words, the exhaust pipe 13 discharges the exhaust gas to the outside of the engine 1. Specifically, the exhaust pipe 13 has an exhaust passage 131. The exhaust gas then flows through the exhaust passage 131 and the exhaust gas is discharged from the engine 1.

Exhaust gases are utilized by the supercharger 5. Specifically, the supercharger 5 includes a turbine 51 and a compressor 52. The turbine 51 is located in the exhaust pipe 13, and the compressor 52 is located in the air supply pipe 9. The turbine 51 is rotated by the exhaust gas flowing through the exhaust pipe 13 and transfers rotational power to the compressor 52. The compressor 52 is then driven by the rotational force of the turbine 51 thereby to compress the air flowing through the air supply pipe 9 thereby to generate air at a pressure greater than atmospheric pressure.

The engine 1 has a cylinder head 61, a cylinder block 62, an air supply valve 63, an exhaust valve 64, a gas fuel supply unit 65, a liquid fuel injecting unit 66, a liner 67, a piston 68, a connecting rod 69, and a crankshaft 70. The engine 1 also has a combustion chamber 71. The combustion chamber 71 is formed inside the cylinder block 62, and is a space where the gas fuel is combusted. Air and gas fuel are supplied to the combustion chamber 71. In other words, the engine 1 supplies air and gas fuel to the combustion chamber 71 thereby to combust the gas fuel.

The cylinder head 61 is fixed to the top of cylinder block 62. The cylinder head 61 has an air supply passage 72 and an exhaust passage 73.

The air supply manifold 11 is connected to an inlet of the air supply passage 72. Thus, the compressed and cooled air is supplied to the air supply passage 72 from the air supply passage 111 of the air supply manifold 11. An outlet of the air supply passage 72 is connected to the combustion chamber 71.

The gas fuel supply unit 65 is located in the cylinder head 61. Then, to the air supply passage 72, the gas fuel supply unit 65 supplies the gas fuel supplied from the gas fuel supply pipe 3, to thereby supply the gas fuel to the combustion chamber 71 through the air supply passage 72. For example, the gas fuel supply unit 65 provides the gas fuel to the air supply passage 72.

Specifically, the gas fuel is mixed with the air supplied from the air supply passage 111 of the air supply manifold 11 and is then supplied to the combustion chamber 71. In other words, a mixture of gas fuel and air is supplied to the combustion chamber 71. The gas fuel supply unit 65 is, for example, a gas admission valve (GAV) or a gas injector. The mixed gas is preferably a lean mixture. In this case, the engine 1 combusts the gas fuel in the lean mixture.

More specifically, the air supply valve 63 is located at the outlet of the air supply passage 72. The air supply valve 63 opens or closes the outlet of the air supply passage 72. When the air supply valve 63 opens the outlet of air supply passage 72, a mixture of gas fuel and air is supplied to the combustion chamber 71. In detail, when the air supply valve 63 opens, the gas fuel supply unit 65 injects the gas fuel into the air supply passage 72 thereby to supply the gas fuel via the air supply passage 72 to the combustion chamber 71.

For example, the gas fuel supply unit 65 may be located in the air supply manifold 11 or may be located in the air supply pipe 9 downstream from the intercooler 7.

The inlet of the exhaust passage 73 is connected to combustion chamber 71. The outlet of exhaust passage 73 is connected to exhaust pipe 13. Thus, the exhaust gas from combustion chamber 71 is discharged through the exhaust passage 73 to the exhaust pipe 13. Specifically, the exhaust valve 64 is placed at the inlet of the exhaust passage 73. The exhaust valve 64 opens or closes the inlet of the exhaust passage 73. The exhaust valve 64, when opening the inlet of the exhaust passage 73, discharges the exhaust gas through the exhaust passage 73 to the exhaust pipe 13.

The liquid fuel injecting unit 66 injects the liquid fuel, which induces ignition of the gas fuel, into the combustion chamber 71. In other words, the liquid fuel injecting unit 66 injects the liquid fuel into the combustion chamber 71 thereby to ignite the gas fuel supplied to the combustion chamber 71. The injection volume of the liquid fuel by the liquid fuel injecting unit 66 is small enough to induce ignition of the gas fuel. The liquid fuel is, for example, light or heavy oil. The liquid fuel injecting unit 66 is, for example, an injector.

The cylinder block 62 constitutes a cylinder 1a. The cylinder block 62 houses a piston 68, a connecting rod 69, and a crankshaft 70.

The liner 67 is a cylindrical body that fits into the cylinder block 62. The piston 68 reciprocates up and down inside the cylinder block 62 along the liner 67. In other words, the piston 68 reciprocates within the combustion chamber 71. The connecting rod 69 connects the piston 68 to the crankshaft 70. The connecting rod 69 transmits the reciprocating motion of the piston 68 to the crankshaft 70. The crankshaft 70 converts the reciprocating motion of the piston 68 into a rotational motion.

For example, when the piston 68 is lowered and the air supply valve 63 is opened with the exhaust valve 64 closed, the mixture of gas fuel and air is supplied from the air supply passage 72 to the combustion chamber 71 (intake stroke). In other words, the gas fuel supply unit 65 injects the gas fuel at the timing when the air supply valve 63 opens. Next, with the exhaust valve 64 and the air supply valve 63 closed, the piston 68 rises (compression stroke). Next, at the top dead center of the piston 68, the liquid fuel is injected by liquid fuel injecting unit 66, and the gas fuel is ignited and combusted (combustion stroke). As a result, the combustion lowers the piston 68. Next, the piston 68 rises, and the exhaust valve 64 opens while the air supply valve 63 is closed (exhaust stroke). As a result, the exhaust gas is discharged from the combustion chamber 71 to the exhaust passage 73.

As described above with reference to FIG. 1, the engine 1 generates power by combusting the gas fuel mixed with air.

Figure 2:
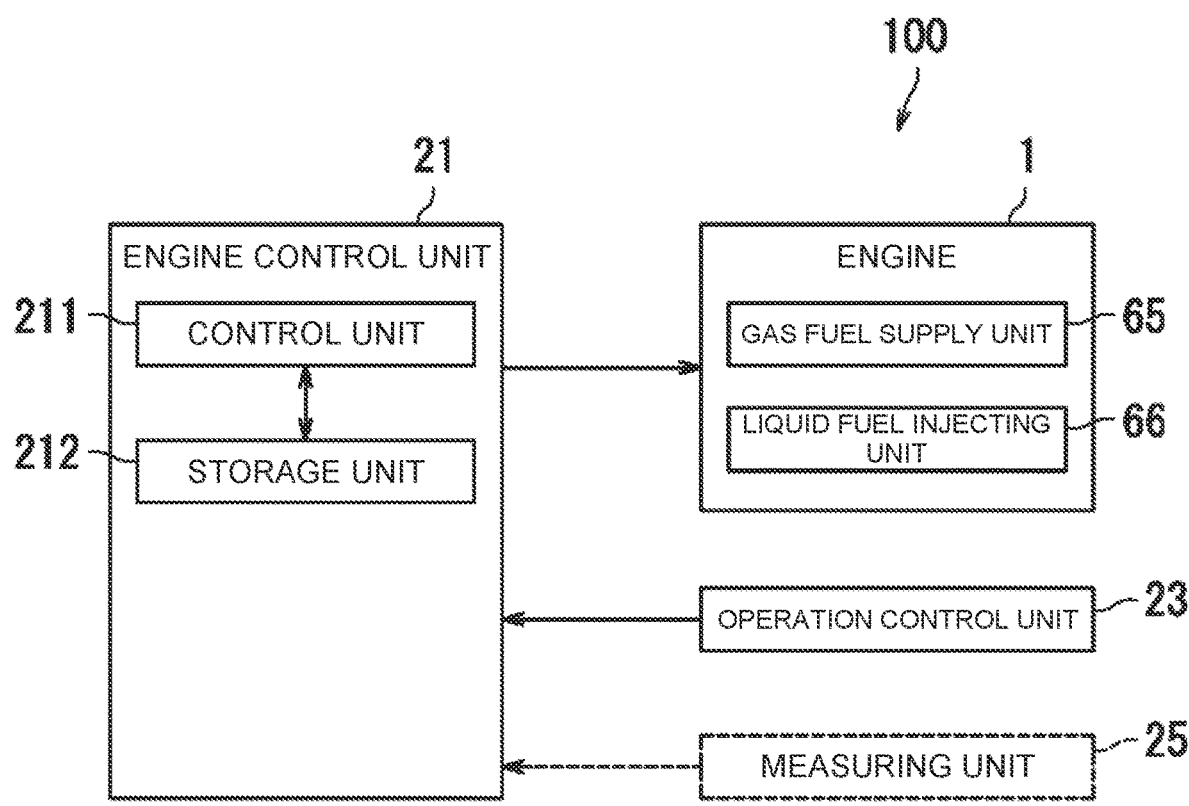
FIG. 2 is a block diagram showing the engine system according to the present embodiment.
Figure 3A:
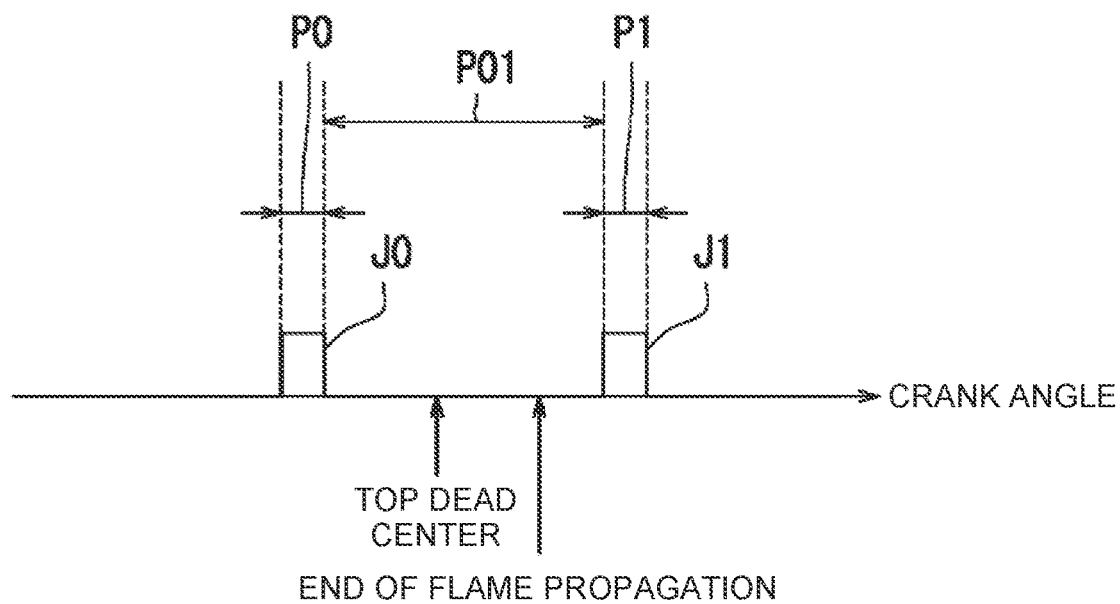
FIG. 3A is a diagram showing an example of liquid fuel injection timing according to the present embodiment.
Figure 3B:
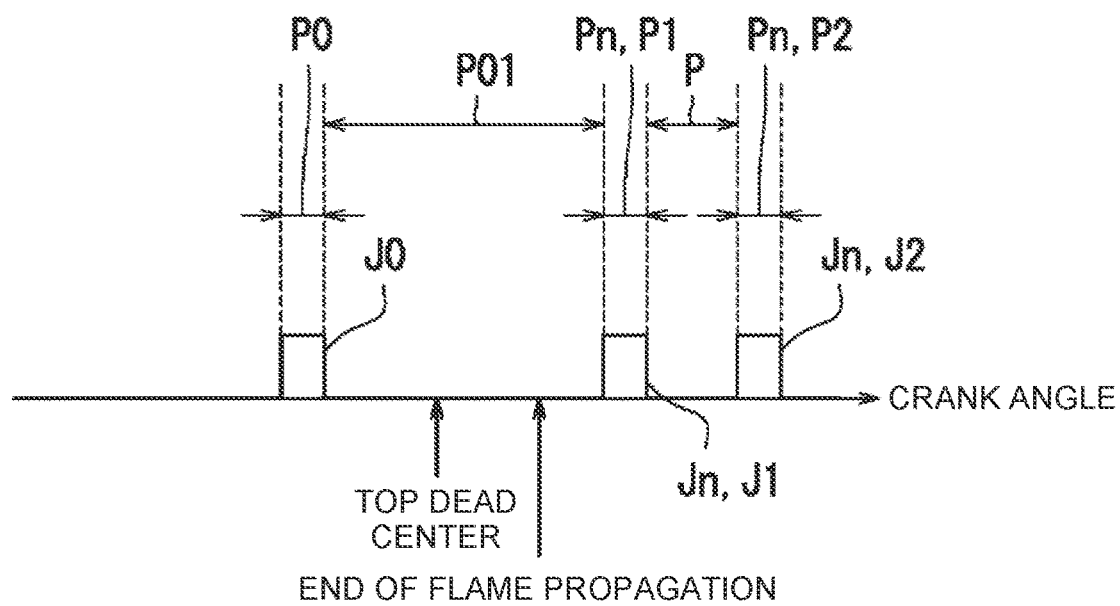
FIG. 3B is a diagram showing another example of the liquid fuel injection timing according to the present embodiment.

Next, the engine system 100 is described with reference to FIG. 2. FIG. 2 is a block diagram showing the engine system 100. As shown in FIGS. 3A and 3B, the engine system 100 is further equipped with an engine control unit 21, an operation control unit 23. A measuring unit 25 is described below as a modified example.

The operation control unit 23 receives an operation from a human operator and outputs an operation signal to the engine control unit 21 in response to the operation from the human operator.

The operation control unit 23 includes, for example, an input unit, a display unit, and a computer. Input units include, for example, keyboards, pointing devices, dials, and push buttons. The display unit is, for example, a liquid crystal display. The display unit may include, for example, a touch screen. The computer includes, for example, a processor and a storage device. The operation control unit 23 is, for example, an operation control panel.

The engine control unit 21 controls the engine 1. For example, the engine control unit 21 controls the engine 1 in response to an operation signal output by the operation control unit 23. For example, the engine control unit 21 controls the engine 1 according to a computer program.

The engine control unit 21 is, for example, a computer. Computers can be, for example, ECUs (Electronic Control Units). Specifically, the engine control unit 21 includes a control unit 211 and a storage unit 212. The control unit 211 includes a processor such as a CPU (central processing unit). The storage unit 212 includes a storage device and stores data and a computer program. The storage devices include, for example, main and auxiliary storage units such as semiconductor memory. The storage device may include a removable medium.

The control unit 211 controls the engine 1. Specifically, the control unit 211 controls the gas fuel supply unit 65 and the liquid fuel injecting unit 66. More specifically, the processor of the control unit 211 executes the computer program stored in the storage device of the storage unit 212, thereby to control the gas fuel supply unit 65 and the liquid fuel injecting unit 66.

In particular, in the present embodiment; so as to ignite the gas fuel, the control unit 211 controls the liquid fuel injecting unit 66 in a manner to inject the liquid fuel into the combustion chamber 71. As a result, the liquid fuel injecting unit 66 injects the liquid fuel into the combustion chamber 71. Thus, the gas fuel is ignited in the combustion chamber 71, thereby to combust the gas fuel.

Further, the control unit 211 controls the liquid fuel injecting unit 66 in a manner to execute the injection of liquid fuel after the flame propagation after the ignition of the gas fuel is ended. As a result, the liquid fuel injecting unit 66 performs the injection of the liquid fuel after the flame propagation after the ignition of gas fuel is ended. Thus, with the engine system 100 according to the present embodiment, at least one of the followings can be achieved when combusting the gas fuel: suppressing of generating of nitrogen oxides and suppressing of remaining of uncombusted hydrocarbons. This is demonstrated by examples described below. For example, when the mixture of gas fuel and air (i.e., the mixture supplied to the combustion chamber 71) is in an effective lean state, igniting the liquid fuel after the flame propagation after ignition of the gas fuel is ended can suppress generating of nitrogen oxides and suppress remaining of uncombusted hydrocarbons. This point is also demonstrated in the examples described below.

The effective lean state is a state in which an air excess ratio $\lambda$ of the mixed gas is within the specified range. The specified range of the air excess ratio $\lambda$ is greater than "1" and is based on the engine 1's specifications. The specified range of the air excess ratio $\lambda$ shows the practically effective range of the engine 1. For example, the specified range of the air excess ratio $\lambda$ is between 1.80 and 2.00, both inclusive.

In the present embodiment, preferably, the control unit 211 controls the liquid fuel injecting unit 66 in a manner to perform the liquid fuel injection after the end of flame propagation, after the top dead center of the piston 68, at the crank angle in the range of 30 degrees or more and less than 60 degrees. As a result, the liquid fuel injecting unit 66 injects the liquid fuel after the end of flame propagation, after the top dead center of the piston 68, at the crank angle in the range of 30 degrees or more and less than 60 degrees. Thus, according to the present preferred example, at least one of the followings can be achieved when combusting the gas fuel: further suppressing of generating of nitrogen oxides and further suppressing of remaining of uncombusted hydrocarbons. This is demonstrated by examples described below. For example, when the mixed gas is in an effective lean state, performing the liquid fuel injection after the end of flame propagation, after the top dead center of the piston 68, at the crank angle in the range of 30 degrees or more and less than 60 degrees, can further suppress generating of nitrogen oxides and can further suppress remaining of uncombusted hydrocarbons. This point is also demonstrated in the examples described below. At the crank angle in the range of 30 degrees or more and less than 60 degrees, the combustion chamber 71 is in a state where the flame propagation after ignition of gas fuel has been ended.

In the following description, "injection of liquid fuel for ignition" is, as the case may be, described as "main injection". The "injection of liquid fuel after the end of flame propagation" is the injection of liquid fuel following the "main injection". Therefore, "injection of liquid fuel after the end of flame propagation" are, as the case may be, described as "subsequent injection of liquid fuel", "subsequent injection", or "subsequent injection". However, "subsequent" is not limited to "next" to the "main injection" as long as being "after" the "main injection," but also includes further "next" to "next" to the "main injection," for example. In other words, as long as being "after" the "main injection", "subsequent" is "subsequent". In the present specification, "subsequent" shows after the "main injection" and after the end of flame propagation.

Next, the main and subsequent injections by the liquid fuel injecting unit 66 are described with reference to FIGS. 2 and 3. FIG. 3A is a diagram showing an example of liquid fuel injection timing by the liquid fuel injecting unit 66. The abscissa shows the crank angle. The crank angle is the phase angle of the piston 68. The abscissa can also be viewed as showing time by the crank angle.

As shown in FIG. 2 and FIG. 3A, the liquid fuel injecting unit 66 performs the main injection during a predetermined main injection period P0, and ends the main injection at the expiration of the predetermined main injection period P0. In the example in FIG. 3A, the liquid fuel injecting unit 66 performs a main injection J0 before the top dead center of the piston 68.

Further, with a time interval P01 provided for the main injection J0, the liquid fuel injecting unit 66 executes a subsequent injection J1 after the flame propagation is ended. The liquid fuel injecting unit 66 performs the subsequent injection J1 in a predetermined subsequent injection period P1, and ends the subsequent injection at the expiration of the predetermined subsequent injection period P1.

FIG. 3B is a diagram showing another example of the liquid fuel injection timing by the liquid fuel injecting unit 66. As shown in FIGS. 2 and 3B, the liquid fuel injecting unit 66 may perform a plurality of subsequent injections Jn with a time interval P. In the present specification, "n" at the end of a reference sign shows an integer greater than or equal to one. When a plurality of subsequent injections Jn are performed, a plurality of predetermined subsequent injection periods Pn are set for each of the plurality of subsequent injections Jn. In this case, the plurality of predetermined subsequent injection periods Pn may be the same or different. When three or more subsequent injections Jn are performed, the time interval P of the temporally adjacent subsequent injections Jn may be the same or may be different.

The subsequent injection Jn shows being an injection subsequent to the main injection J0. However, the subsequent injection Jn may be any injection after the main injection J0, and includes not only the injection J1 immediately after the main injection J0, but also injections J2, J3 . . . .

One or more injections of liquid fuel may be performed between the main injection J0 and the subsequent injection J1 that is after the end of flame propagation.

Figure 4:
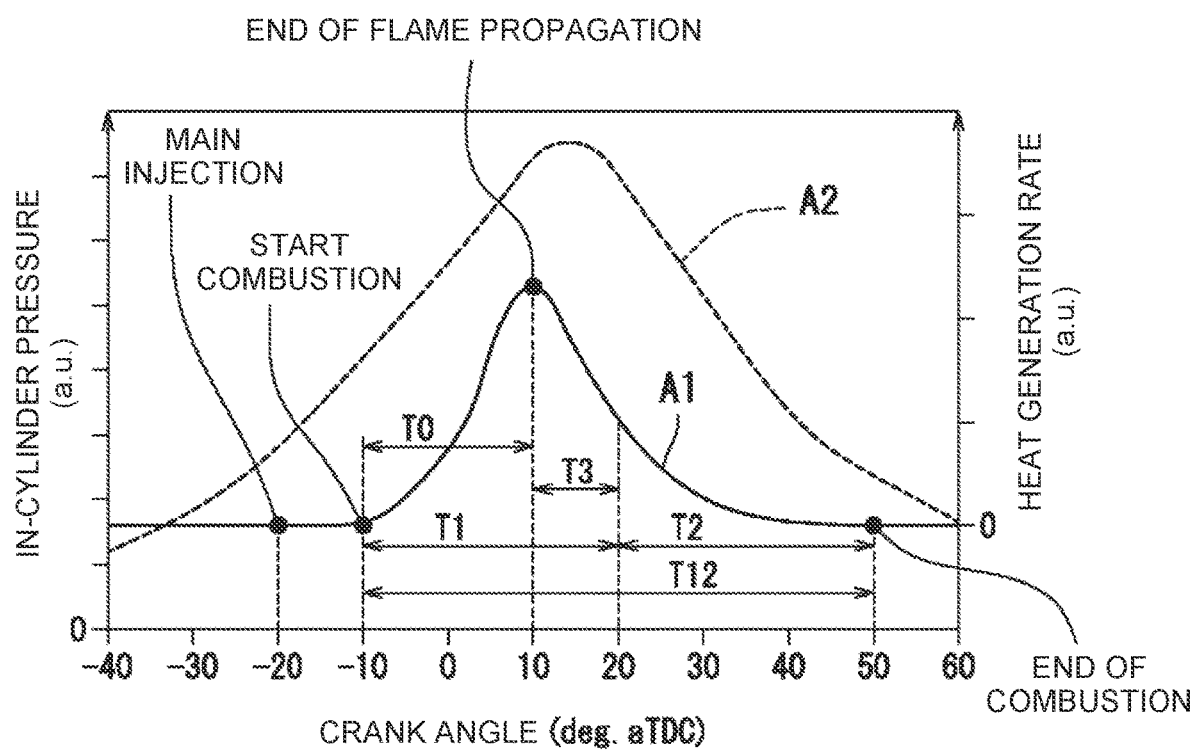
FIG. 4 is a diagram schematically showing combustion characteristics of gas fuel in an engine according to the present embodiment.

Next, combustion characteristics of gas fuel, such as flame propagation, will be described, referring to FIG. 4. FIG. 4 is a diagram schematically showing combustion characteristics of gas fuel in the combustion chamber 71. In FIG. 4, the abscissa shows the crank angle (deg. aTDC: after Top Dead Center). In FIG. 4, the crank angle of 0 degree shows the top dead center of the piston 68. The abscissa can also be viewed as showing time by the crank angle. The left ordinate shows an in-cylinder pressure (a. u.). The in-cylinder pressure shows the internal pressure of the combustion chamber 71. The unit of the in-cylinder pressure is, for example, "MPa". The right ordinate shows the heat generation rate (a. u.) in the combustion chamber 71. The heat generation rate shows the combusting state of gas fuel in the combustion chamber 71. The unit of the heat generation rate is, for example, "J/deg.".

As shown in FIG. 4, a heat generation rate curve A1 shows the heat generation rate. A pressure curve A2 shows the in-cylinder pressure. In FIG. 4, the relation among the heat generation rate curve A1, the pressure curve A2 and the crank angle is merely an exemplification. The shapes of the heat generation rate curve A1 and pressure curve A2 are also merely exemplifications. In the following, the heat generation rate curve A1 attracts attention.

The main injection starts at a timing prior to the top dead center of the piston 68. In the example in FIG. 4, the main injection is started when the crank angle is "−20 degrees".

Next, the start of gas fuel combustion is when the heat generation rate, shown by the heat generation rate curve A1, rises from zero (substantially zero). In the example in FIG. 4, when the crank angle is "−10 degrees", the gas fuel is ignited by the liquid fuel, starting combustion of the gas fuel. The flame propagation starts in the combustion chamber 71 at the same time when combustion of the gas fuel starts in the combustion chamber 71.

Then, the end of flame propagation is generally when the heat generation rate, as shown by the heat generation rate curve A1, shows a maximum value. In the example in FIG. 4, the flame propagation ends when the crank angle is "10 degrees". The end of flame propagation shows when the flame reaches an inner peripheral face of the combustion chamber 71.

A flame propagation period T0 shows a period from the start of flame propagation (e.g., crank angle=−10 degrees) to the end of flame propagation (e.g., crank angle=10 degrees).

The former half of the flame propagation period T0 is the period from the start of the flame propagation (e.g., crank angle=−10 degrees) to the middle of the flame propagation (e.g., crank angle=0 degree). The latter half of the flame propagation period T0 is the period from the middle of the flame propagation (e.g., crank angle=0 degree) to the end of flame propagation (e.g., crank angle=10 degrees).

The end of gas fuel combustion is when the heat generation rate, as shown by the heat generation rate curve A1, goes from a value greater than zero (substantially zero) to zero (substantially zero). In the example in FIG. 4, the gas fuel combustion ends when the crank angle is "50 degrees".

A combustion period T12 of gas fuel is the period from the start of gas fuel combustion (e.g., crank angle=−10 degrees) to the end of combustion (e.g., crank angle=50 degrees). A period T1, which is the former half of the combustion period T12 of gas fuel, shows the period from the start of gas fuel combustion (e.g., crank angle=−10 degrees) to the middle of the combustion (e.g., crank angle=20 degrees). A period T2 of the latter half of the combustion period T12 of gas fuel shows the period from the middle of gas fuel combustion (e.g., crank angle=20 degrees) to the end of the combustion (e.g., crank angle=50 degrees).

In the present embodiment, after the flame propagation after ignition of the gas fuel is ended, the liquid fuel injecting unit 66 (FIG. 1) performs the liquid fuel injection subsequent to the main injection (subsequent injection). In other words, at and after the end of flame propagation (10 degrees)

and before the end of gas fuel combustion (50 degrees), the liquid fuel injecting unit 66 performs the liquid fuel injection subsequent to the main injection. The term "at and after the end" includes "at the end".

Preferably, the control unit 211 (FIG. 2) controls the liquid fuel injecting unit 66 so that the subsequent injection of liquid fuel (injection of liquid fuel after the end of flame propagation) starts within a former period T3 of the combustion period T12 of gas fuel. As a result, after the flame propagation after the ignition of the gas fuel is ended, the liquid fuel injecting unit 66 performs the subsequent injection of the gas fuel within the former period T3 of the combustion period T12 of gas fuel. Thus, according to the present preferred example, the temperature in the combustion chamber 71 is higher than at the time of ignition, at the timing when the subsequent liquid fuel reaches the vicinity of the clevis volume. Thus, uncombusted hydrocarbons that leak from the clevis volume as the piston 68 moves from the top dead center to the bottom dead center can be effectively oxidized. As a result, the remaining volume of uncombusted hydrocarbons can be effectively reduced. The period T3 shows the period when the flame propagation after the ignition of gas fuel is ended.

The clevis volume is a gap or a gap volume between the piston 68 and the liner 67.

Figure 5A:
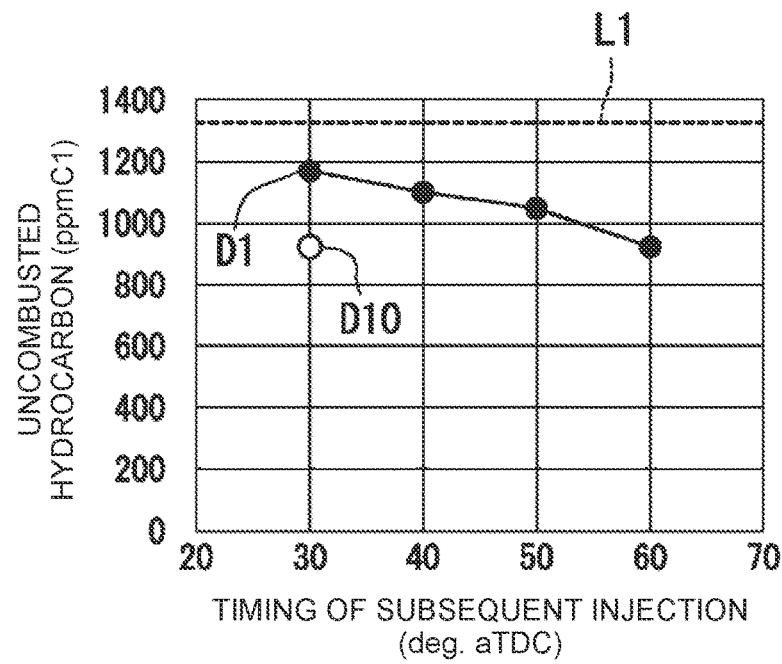
FIG. 5A is a graph schematically showing the remaining volume of uncombusted hydrocarbons in the engine according to the present embodiment.
Figure 5B:
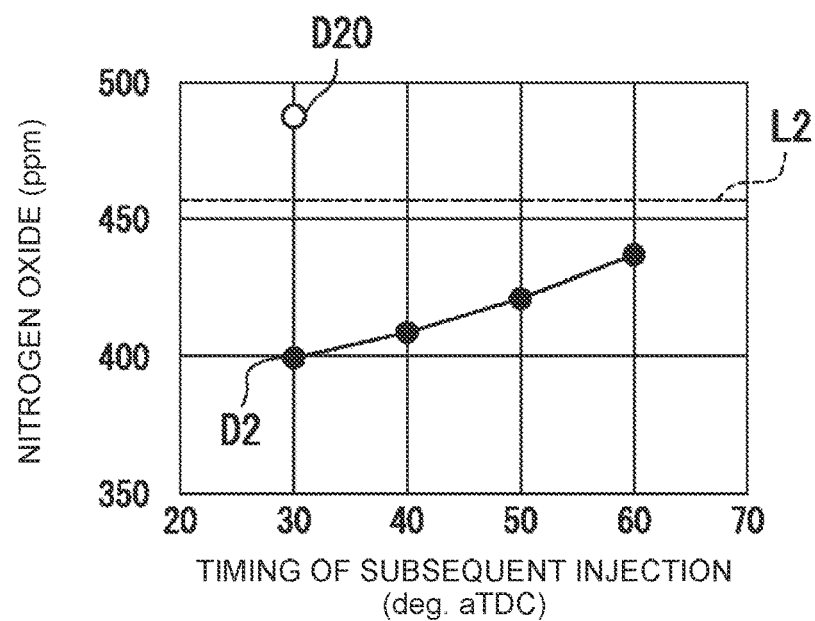
FIG. 5B is a graph schematically showing the generated volume of nitrogen oxides in the engine according to the present embodiment.

Next, the generated volume of nitrogen oxides and the remaining volume of uncombusted hydrocarbons according to the present embodiment will be described referring to FIGS. 5A and 5B. FIG. 5A is a graph schematically showing the remaining volume of uncombusted hydrocarbons in the engine 1. The ordinate shows the remaining volume of uncombusted hydrocarbons (ppmC1). FIG. 5B is a graph schematically showing the generated volume of nitrogen oxides in the engine 1. The ordinate shows the generated volume (ppm) of nitrogen oxides. In FIGS. 5A and 5B, the abscissa shows the timing of the subsequent injection by the crank angle (deg. aTDC). The crank angle of 0 degree shows the top dead center of the piston 68. The abscissa can also be viewed as showing time by the crank angle.

In FIG. 5A, a dashed line L1 shows the remaining volume of uncombusted hydrocarbons that is seen when no subsequent injection is performed (main injection only, reference case). A dot D1, shown by a black circle, shows the remaining volume of uncombusted hydrocarbons that is seen when the subsequent injection is performed. Hereafter, the remaining volume that is seen when the subsequent injection is not performed is, as the case may be, described as "L1," and the remaining volume that is seen when the subsequent injection is performed is, as the case may be, described as "D1" corresponding to the dot D1.

The remaining volume D1 of uncombusted hydrocarbons that is seen when the subsequent injection is performed is less than the remaining volume L1 of uncombusted hydrogen that is seen when the subsequent injection is not performed. In particular, the larger the crank angle at which the subsequent injection is performed, the smaller the remaining volume D1 of uncombusted hydrocarbons. In other words, after the flame propagation after the ignition of gas fuel is ended, the later the timing of the subsequent injection, the less the remaining volume D1 of uncombusted hydrocarbons.

In FIG. 5B, a dashed line L2 shows the generated volume of nitrogen oxides that is seen when the subsequent injection is not performed (main injection only, reference case). A dot D2, shown by a black circle, shows the generated volume of nitrogen oxides that is seen when the subsequent injection is performed. Hereafter, the generated volume that is seen when the subsequent injection is not performed is, as the case may be, described as "L2," and the generated volume that is seen when the subsequent injection is performed is, as the case may be, described as "D2" corresponding to the dot D2.

The generated volume D2 of nitrogen oxides that is seen when the subsequent injection is performed is less than a generated volume L2 of nitrogen oxides that is seen when the subsequent injection is not performed. In particular, the smaller the crank angle at which the subsequent injection is performed, the less the generated volume L2 of nitrogen oxides. In other words, after the flame propagation after the ignition of gas fuel is ended, the earlier the timing of the subsequent injection, the less the generated volume L2 of nitrogen oxides.

As shown in FIGS. 5A and 5B, performing the subsequent injection can reduce the remaining volume of uncombusted hydrocarbons and the generated volume of nitrogen oxides. However, the subsequent injection's timing when a reduction width (=L1−D1) of the remaining volume D1 of uncombusted hydrocarbons becomes large (e.g., crank angle=60°) is the same as the subsequent injection's timing (e.g., crank angle=60 degrees) when a reduction width (=L2−D2) of the generated volume D2 of nitrogen oxides becomes small. Meanwhile, the subsequent injection' timing when the reduction width of the generated volume D2 of nitrogen oxides becomes large (e.g., crank angle=30 degrees) is the subsequent injection's timing (e.g., crank angle=30 degrees) when the reduction width of the remaining volume D1 of uncombusted hydrocarbons becomes small. Therefore, adjusting the timing of the subsequent injection can adjust the remaining volume D1 of uncombusted hydrocarbons and the generated volume D2 of nitrogen oxides.

The uncombusted hydrocarbons and the nitrogen oxides are one example of exhaust substances from engine 1.

In particular, in the present embodiment, it is preferable that the control unit 211 (FIG. 2) changes at least one of the followings: the number of subsequent injections of liquid fuel (the number of injections of liquid fuel after the end of flame propagation), the volume of subsequent injections of liquid fuel (the injection volume of liquid fuel after the end of flame propagation), and the timing of the subsequent injection of liquid fuel (timing of the injection of the liquid fuel after the end of flame propagation), thereby to adjust the volume of exhaust substances (uncombusted hydrocarbons and nitrogen oxides) from the engine 1. According to the present preferred example, while reducing the remaining volume of uncombusted hydrocarbons and the generated volume of nitrogen oxides compared to the case in which the subsequent injection is not performed, the balance between the remaining volume of uncombusted hydrocarbons and the generated volume of nitrogen oxides can be easily adjusted.

Specifically, based on the relation between the remaining volume D1 of uncombusted hydrocarbons and the timing of the subsequent injection, and the relation between the generated volume D2 of nitrogen oxides and the timing of subsequent injection, the control unit 211 changes at least one of the followings: the number of subsequent injections, the injection volume of the subsequent injection, and the timing of the subsequent injection, thereby to adjust the remaining volume of uncombusted hydrocarbons and the generated volume of nitrogen oxides. In this case, the control unit 211 can change the number of subsequent injections, the injection volume of the subsequent injections, and the timing of the subsequent injections by controlling the liquid fuel injecting unit 66.

As an example, the control unit 211 performs the subsequent injections at both of the subsequent injection's timing (e.g., crank angle=30 degrees) when the reduction width (=L2−D2) of the generated volume D2 of nitrogen oxides is large, and the subsequent injection's timing (e.g., crank angle=60 degrees) when the reduction width (=L1−D1) of the remaining volume D1 of uncombusted hydrocarbons is large. In this example, both of the reduction width of the generated volume D2 of nitrogen oxides, and the reduction width of the remaining volume D1 of uncombusted hydrocarbons can be increased.

Referring to FIGS. 5A and 5B continuously, the relation between the uncombusted hydrocarbons and the nitrogen oxides, and the air excess ratio $\lambda$ and the air-fuel ratio is described.

The air excess ratio $\lambda$ is a value obtained by dividing a mass Ma of air actually supplied to the combustion chamber 71 by a theoretically required minimum mass Mb of air (Ma/Mb), and is an indicator of the degree of air surplus in the mixed gas. The air excess ratio $\lambda$ is also equal to the actual air-fuel ratio divided by the theoretical air-fuel ratio. For example, when the air excess ratio $\lambda$ is less than "1", the mixed gas of gas fuel and air is a rich mixture (a mixture of dense gas fuel). The state in which the air excess ratio $\lambda$ of the mixed gas is less than "1" is, as the case may be, described as a "rich state". Meanwhile, when, for example, the air excess ratio $\lambda$ is greater than "1", the mixed gas of gas fuel and air is a lean mixture (a mixture of thin gas fuel). The state in which the air excess ratio $\lambda$ of the mixed gas is greater than "1" is, as the case may be, described as a "lean state".

The air-fuel ratio is a value obtained by dividing a mass Mx of air by a mass My of gas fuel (Mx/My).

In FIG. 5A, a dot D10, shown by a white circle, shows the remaining volume of uncombusted hydrocarbons that is seen when the subsequent injection is performed. Hereafter, the remaining volume of uncombusted hydrocarbons that is seen when the subsequent injection is performed is, as the case may be, referred to as "D10" corresponding to the dot D10.

The air excess ratio $\lambda$ (e.g., lean state richer than the effective lean state) seen when the remaining volume of uncombusted hydrocarbons shows the remaining volume D10 is smaller than the air excess ratio $\lambda$ (e.g., the effective lean state) seen when the remaining volume of uncombusted hydrocarbons shows the remaining volume D1. Therefore, when the timing of the subsequent injection is the same, the smaller the air excess ratio $\lambda$ (air-fuel ratio), the less the remaining volume of uncombusted hydrocarbons. Therefore, controlling the air excess ratio $\lambda$ (air-fuel ratio) can adjust the remaining volume of uncombusted hydrocarbons, even when the timing of the subsequent injection is the same.

In FIG. 5B, a dot D20, shown by a white circle, shows the generated volume of nitrogen oxides that is seen when the subsequent injection is performed. Hereafter, the generated volume of nitrogen oxides that is seen when the subsequent injection is performed is, as the case may be, referred to as "D20" corresponding to the dot D20.

The air excess ratio $\lambda$ (e.g., the lean state richer than the effective lean state) seen when the generated volume of nitrogen oxides shows the generated volume D20 is smaller than the air excess ratio $\lambda$ (e.g., the effective lean state) seen when the generated volume of nitrogen oxides shows a generated volume D2. Therefore, when the timing of the subsequent injection is the same, the smaller the air excess ratio $\lambda$ (air-fuel ratio), the more the generated volume of nitrogen oxides. Therefore, controlling the air excess ratio $\lambda$ (air-fuel ratio) can adjust the generated volume of nitrogen oxides, even when the timing of the subsequent injection is the same.

In particular, in the present embodiment, the control unit 211 (FIG. 2) controls the air excess ratio $\lambda$ in the combustion chamber 71 according to the condition for injecting the subsequent liquid fuel (condition for subsequent injection). In other words, the control unit 211 controls the air excess ratio $\lambda$ in the combustion chamber 71 according to the condition for injecting liquid fuel after the end of flame propagation. As a result, the balance between the effect of reducing the remaining volume of uncombusted hydrocarbons and the effect of reducing the generated volume of nitrogen oxides can be adjusted according to the object of reducing the exhaust substance.

The condition for the subsequent injection is, for example, the timing of the subsequent injection. As can be understood from FIGS. 5A and 5B, depending on the timing of the subsequent injection, to which reduction effect, that is, the effect of reducing uncombusted hydrocarbons and the effect of reducing nitrogen oxides the subsequent injection contributes varies. So, for example, when the subsequent injection is performed at the crank angle with a great reduction volume of nitrogen oxides (e.g., timing of 30 degree), the control unit 211 shifts the air excess ratio $\lambda$ to the rich side while maintaining the air excess ratio $\lambda$ lean. As a result, the generated volume of nitrogen oxides, which had cleared the legal limit level with a margin, can be returned to the legal limit level, making it possible to increase the effect of reducing the remaining volume of uncombusted hydrocarbons.

Here, the control quantity for controlling the air excess ratio $\lambda$ is, for example, the mixed gas flow rate, gas fuel flow rate, or air flow rate. Therefore, the control unit 211 can control the air excess ratio $\lambda$ by controlling the control amount.

Figure 6:
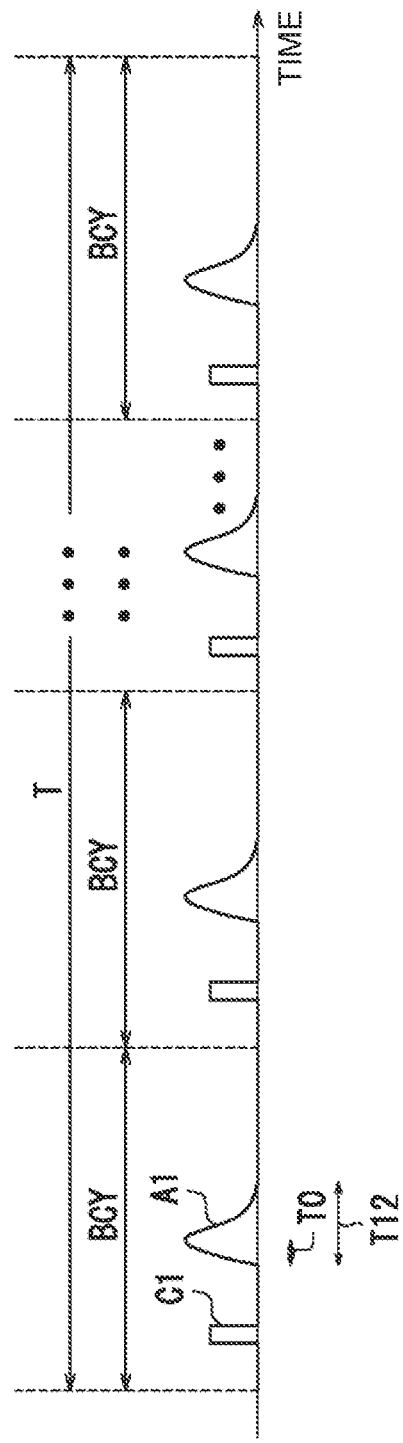
FIG. 6 is a time chart schematically showing a combustion cycle of the engine according to the present embodiment.

Next, a combustion cycle BCY of the engine 1 is described with reference to FIGS. 2 and 6. FIG. 6 is a time chart schematically showing the combustion cycle BCY of the engine 1. The abscissa shows time. Time is shown, for example, by the crank angle. A pulse shape Cl schematically shows the period of supplying the gas fuel. A curve A1 corresponds to the heat generation rate curve A1 in FIG. 4, and schematically shows the heat generation state. A period T0 corresponds to the flame propagation period T0 in FIG. 4, and a period T12 corresponds to the combustion period T12 in FIG. 4.

As shown in FIG. 2 and FIG. 6, the engine 1 repeats the combustion cycle BCY. A predetermined period T attracts attention. The engine 1 performs a plurality of combustion cycles BCY in the predetermined period T. For each combustion cycle BCY, the liquid fuel injecting unit 66 performs ignition of gas fuel (main injection) and the subsequent injection of liquid fuel (injection of liquid fuel after the end of flame propagation). Within the predetermined period T, the control unit 211 prohibits an increase in the liquid fuel's injection volume (injection volume of the main injection) that is seen when igniting the gas fuel. The "increase in the liquid fuel's injection volume that is seen when igniting the gas fuel" refers to an increase in the injection volume of liquid fuel that corresponds to an increase in a load on the engine 1. The increase in load shows, for example, that the load on the engine 1 exceeds a threshold value. The cause for the load increase may be, for example, an increase in vessel speed, a change in rudder angle, or a strong wave or wind to which the vessel is subjected. The predetermined period T shows 10 seconds.

In other words, in the present embodiment, the increase (within 10 seconds), due to the increase in load, in the liquid fuel's injection volume that is seen when igniting the gas fuel (injection volume of main injection) is prohibited. In other words, a short-term increase in injection volume caused by the increase in load on the engine 1 is prohibited.

Thus, in the engine system 100 having the supercharger 5, the injection of liquid fuel to such an extent as to accompany a sudden increase in air feed pressure is prohibited. As a result, the air excess ratio λ (air-fuel ratio) can be suppressed from causing a large fluctuation relative to a target value, making it possible to prevent an emission from deteriorating. Deterioration of the emission shows, for example, an increase in generated volume of nitrogen oxides or an increase in the remaining volume of uncombusted hydrocarbons.

In FIG. 6, the flame propagation period T0 is, for example, about 4.6 milliseconds (=about 20 degrees crank angle). The combustion period T12 of gas fuel is, for example, about 13.4 milliseconds (=crank angle of about 60 degrees). The combustion cycle BCY is, for example, ⅙ second (=720 degree crank angle).

Figure 7:
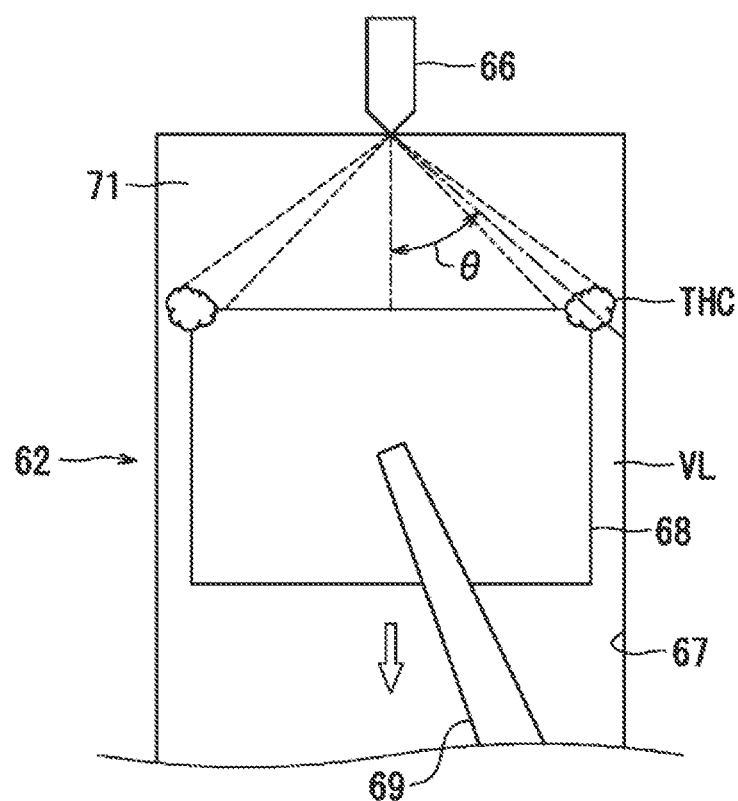
FIG. 7 is a diagram schematically showing an injection angle of the liquid fuel according to the present embodiment.

Next, the liquid fuel's injection angle θ by the liquid fuel injecting unit 66 is described with reference to FIG. 7. FIG. 7 is a diagram schematically showing the injection angle θ of the liquid fuel according to the present embodiment. As shown in FIG. 7, an uncombusted hydrocarbon THC that had been pushed into a clevis volume VL leaks out of the clevis volume VL when the piston 68 moves from the top dead center to the bottom dead center.

Then, in the present embodiment, the liquid fuel's injection angle θ by the liquid fuel injecting unit 66, that is, the liquid fuel's injection angle θ relative to the direction of movement of the piston 68 is between 30 degrees and 65 degrees, both inclusive. Therefore, at the timing when the uncombusted hydrocarbon THC leaks out of the clevis volume VL when the piston 68 moves from the top dead center to the bottom dead center, the liquid fuel injected from the liquid fuel injecting unit 66 (e.g., liquid fuel by subsequent injection) reaches the vicinity of the clevis volume VL. As a result, the liquid fuel can effectively oxidize the uncombusted hydrocarbon THC leaking out of the clevis volume VL. Thus, the remaining volume of uncombusted hydrocarbon THC can be effectively reduced.

The control unit 211 (FIG. 2) may, depending on specifications for the engine 1 and/or specifications for the liquid fuel injecting unit 66, set a limitation on at least one of the control of the injection volume of liquid fuel in the subsequent injection and the control of the timing of the subsequent injection. This is because, depending on the injection volume of liquid fuel in the subsequent injection and/or the timing of the subsequent injection, there may be a possibility that the liquid fuel should impinge on the liner 67 thereby to dilute the lubricating oil on the liner 67 surface by the liquid fuel. The specifications for the engine 1 are, for example, the bore or stroke of the engine 1. The specifications for the liquid fuel injecting unit 66 are, for example, the injection diameter, injection angle θ, or injection volume of the liquid fuel injecting unit 66.

Figure 8:
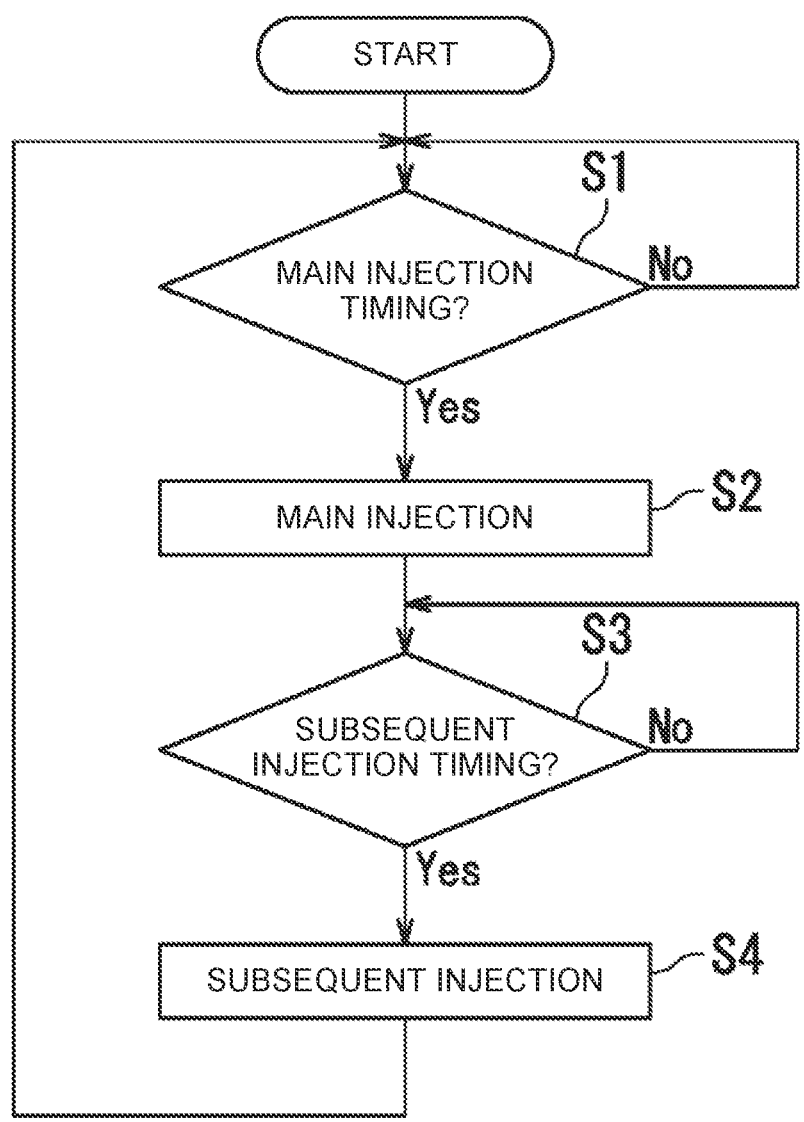
FIG. 8 is a flowchart showing a gas fuel combustion method according to the present embodiment.

Referring now to FIGS. 2 and 8, the gas fuel combustion method in the engine 1 is described. FIG. 8 is a flowchart showing the gas fuel combustion method according to the present embodiment. The gas fuel combustion method is performed by the engine system 100 shown in FIG. 2. As shown in FIG. 8, the gas fuel combustion method includes steps S1 through S4.

First, in step S1, the control unit 211 of the engine system 100 determines whether or not the timing for the main injection has arrived.

When it is determined in step S1 that the timing for the main injection has not arrived (No), the process waits for step S1.

Meanwhile, when it is determined in step S1 that the timing for the main injection has arrived (Yes), the process proceeds to step S2.

Next, in step S2, the control unit 211 controls the liquid fuel injecting unit 66 in a manner to perform the main injection. As a result, the liquid fuel injecting unit 66 performs the main injection. In other words, the liquid fuel injecting unit 66 injects the liquid fuel thereby to ignite the gas fuel. As a result, gas fuel is combusted.

Next, in step S3, the control unit 211 determines whether or not the timing for the subsequent injection has arrived.

When it is determined in step S3 that the timing for the subsequent injection has not arrived (No), the process waits for step S3.

Meanwhile, when it is determined in step S3 that the timing for the subsequent injection has arrived (Yes), the process proceeds to step S4.

Next, in step S4, the control unit 211 controls the liquid fuel injecting unit 66 in a manner to execute the subsequent injection. As a result, the liquid fuel injecting unit 66 performs the subsequent injection. Specifically, after the flame propagation after the ignition of gas fuel is ended, the liquid fuel injecting unit 66 executes the injection of liquid fuel. Thereafter, the process proceeds to step S1.

Steps S1 through S4 are executed in one combustion cycle. Thus, steps S1 through S4 are executed for each repeated combustion cycle. In other words, steps S1 through S4 are repeated.

As described above with reference to FIG. 8, with the gas fuel combustion method according to the present embodiment, the injection of liquid fuel (subsequent injection) is executed after the flame propagation after the ignition of gas fuel is ended. As a result, at least one of the followings can be achieved: suppressing of generating of nitrogen oxides and suppressing of remaining of uncombusted hydrocarbons. In particular, when the mixed gas supplied to the combustion chamber 71 is in the effective lean state, the generating of nitrogen oxides can be suppressed while the remaining of the uncombusted hydrocarbons can be suppressed.

When the liquid fuel injecting unit 66 executes a plurality of subsequent injections in one combustion cycle, the same processes as in step S3 and step S4 are executed a plurality of times.

Modified Example

Referring to FIG. 2 and FIG. 9, the engine system 100 according to a modified example of the present embodiment is described. The modified example mainly differs from the present embodiment described above in that the engine system 100 according to the modified example is equipped with a measuring unit 25. Mainly described below are points in which the modified example differs from the present embodiment.

As shown in FIG. 2, in the modified example, the engine system 100 is further equipped with the measuring unit 25. The measuring unit 25 measures a physical substance that directly or indirectly shows the exhaust substance resulting from the combustion of gas fuel. Then, based on a measurement result of the measuring unit 25, the control unit 211 controls the liquid fuel's subsequent injection by the liquid fuel injecting unit 66 (injection of liquid fuel after the end of flame propagation). In other words, in the modified example, feedback control of subsequent injection is executed according to the measurement result of the physical quantity that directly or indirectly shows the exhaust substance. Thus, the subsequent injection can be optimized according to the combustion state of the gas fuel. As a result, the volume of exhaust substance can be effectively reduced. In other words, while generating of nitrogen oxides can be effectively suppressed, remaining of uncombusted hydrocarbons can be effectively suppressed.

The "physical quantity directly indicative of exhaust substances" measured by the measuring unit 25 is, for example, the concentration or mass of the exhaust substance. In this case, for example, the measuring unit 25 is a NOx sensor that detects the concentration of nitrogen oxide (NOx). The unit of concentration is, for example, % or ppm. The unit of mass is, for example, g or kg. When the exhaust substance is soot, the measuring unit 25 is, for example, a soot sensor that detects soot volume.

The control unit 211 controls the subsequent injection by the liquid fuel injecting unit 66 based on the physical quantity that directly shows the exhaust substance. For example, the control unit 211 can control at least one of the followings based on the physical quantity that directly shows the exhaust substance: the injection volume of liquid fuel in the subsequent injection, the timing of the subsequent injection, and the number of subsequent injections.

The "physical quantity that indirectly shows the exhaust substance" measured by the measuring unit 25 is, for example, the in-cylinder pressure (internal pressure of the combustion chamber 71), the temperature of the exhaust gas, or the air excess ratio $\lambda$. In this case, for example, the measuring unit 25 is a pressure sensor or a temperature sensor. Alternatively, the measuring unit 25 is an $O_2$ sensor, a $\lambda$ sensor, or an A/F sensor each for detecting the air excess ratio $\lambda$.

The control unit 211 estimates the combustion state of gas fuel based on physical quantity that indirectly shows the exhaust substance. Then, the control unit 211 controls the subsequent injection by the liquid fuel injecting unit 66 based on the estimated result of the combustion state of gas fuel. For example, the control unit 211 controls at least one of the followings based on the estimated result of the combustion state of the gas fuel: the injection volume of liquid fuel in the subsequent injection, the timing of the subsequent injection, and the number of subsequent injections.

When the measuring unit 25 measures the temperature of the exhaust gas, the control unit 211 monitors the temperature of the exhaust gas thereby to control the temperature of the exhaust gas to be equal to or less than a threshold temperature. As a result, an excessive increase in exhaust gas temperature during the subsequent injection can be suppressed.

Next, the gas fuel combustion method according to the modified example is described with reference to FIGS. 2 and 9. FIG. 9 is a flowchart showing the gas fuel combustion method according to the modified example. The gas fuel combustion method is performed by the engine system 100 shown in FIG. 2. As shown in FIG. 9, the gas fuel combustion method includes steps S11 through S15.

First, in step S11, the control unit 211 of the engine system 100 controls the liquid fuel injecting unit 66 in a manner to perform the main injection. As a result, the liquid fuel injecting unit 66 performs the main injection. As a result, gas fuel is combusted.

Next, in step S12, the control unit 211 controls the liquid fuel injecting unit 66 in a manner to perform the subsequent injection. As a result, the liquid fuel injecting unit 66 performs the subsequent injection. Specifically, after the flame propagation after the ignition of gas fuel is ended, the liquid fuel injecting unit 66 executes the injection of liquid fuel.

Next, in step S13, it is determined whether or not the predetermined number of combustion cycles have been performed.

When it is determined in step S13 that the predetermined number of combustion cycles have not been performed (No), the process proceeds to step S11.

Meanwhile, when it is determined in step S13 that the predetermined number of combustion cycles have been performed (Yes), the process proceeds to step S14.

Next, in step S14, the control unit 211 obtains measurement data from the measuring unit 25. The measurement data show a measured result of the physical quantity that directly or indirectly shows the emission substance.

Next, in step S15, the control unit 211 determines, based on the measured data, a control parameter for the subsequent injection by the liquid fuel injecting unit 66. The control parameter includes at least one of the followings: the number of subsequent injections, the injection volume of liquid fuel in the subsequent injection, and the timing of the subsequent injection.

After step S15, the process proceeds to step S11. Next, in step S11, the control unit 211 controls the liquid fuel injecting unit 66 in a manner to perform the main injection. Next, in step S12, the control unit 211 controls the liquid fuel injecting unit 66 in a manner to perform the subsequent injection according to the control parameter determined in previous step S15.

In this case, too, the injection (subsequent injection) of liquid fuel is performed after the flame propagation after the ignition of gas fuel is ended. Thereafter, step S13 through step S15 are executed. Further, repeating the combustion cycle repeats steps S11 through S15.

As described above with reference to FIG. 9, the modified example repeats the combustion cycle, performing the main injection and the subsequent injection for each combustion cycle.

The present invention will be specifically described with reference to the examples, but the present invention is not limited to the following examples. [Examples]

Referring to FIGS. 1 and 10, examples 1 to 6 and a comparative example of the present invention are described. In the examples 1 to 6, the engine system 100 shown in FIG. 1 was used. In the examples 1 to 6, the subsequent injection is performed after the flame propagation after the gas fuel ignition was ended.

Meanwhile, in the comparative example, no subsequent injection was performed. In the examples 1 to 6 and the comparative example, natural gas vaporized from liquefied natural gas was used as the gas fuel.

Figure 10A:
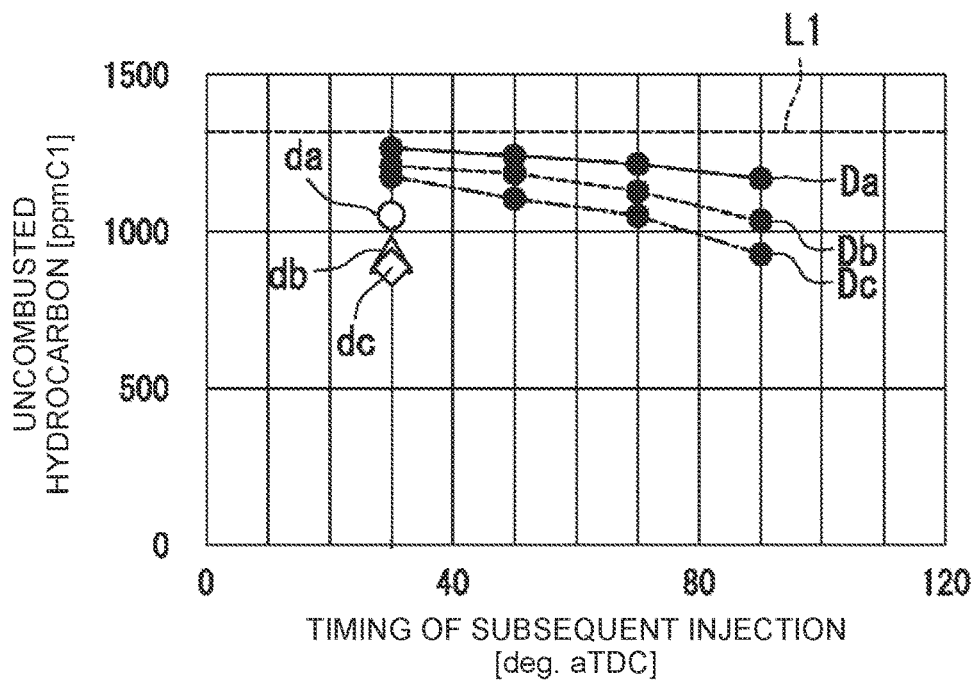
FIG. 10A is a graph showing the remaining volume of uncombusted hydrocarbons in the engines according to examples 1 to 6 of the present invention.
Figure 10B:
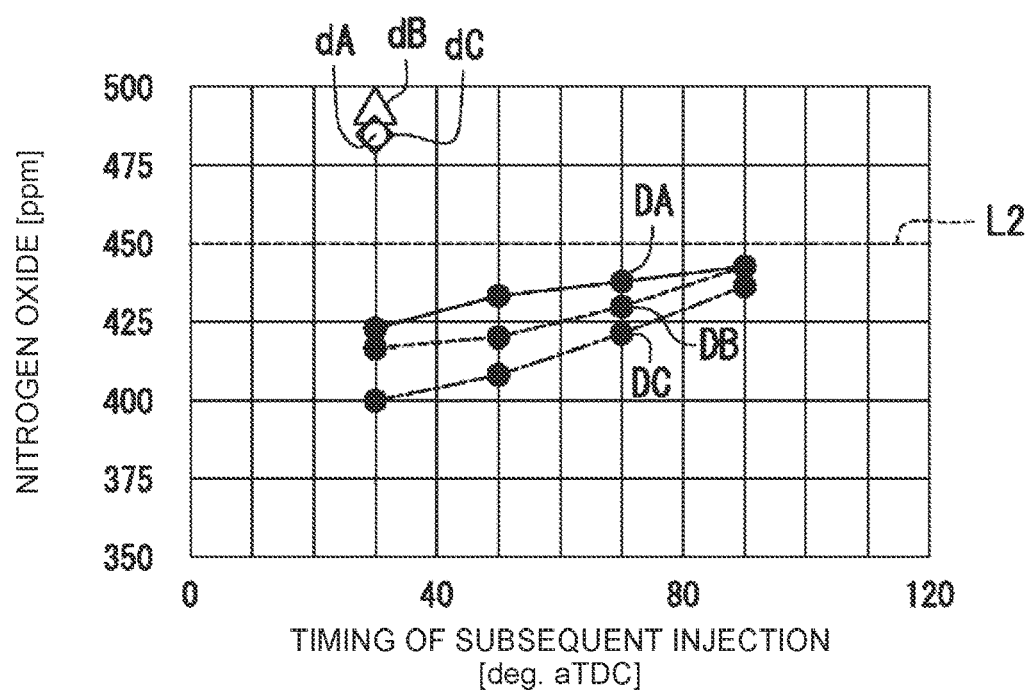
FIG. 10B is a graph showing the generated volume of nitrogen oxides in the engines according to examples 1 to 6 of the present invention.

FIG. 10A is a graph showing the remaining volume of uncombusted hydrocarbons according to the examples 1 to 6 of the present invention. The ordinate shows the remaining volume of uncombusted hydrocarbons (ppmC1). FIG. 10B is a graph showing the generated volume of nitrogen oxides according to the examples 1 to 6 of the present invention. The ordinate shows the generated volume (ppm) of nitrogen oxides. In FIGS. 10A and 10B, the abscissa shows the timing of the subsequent injection by the crank angle (deg. aTDC). The crank angle of 0 degree shows the top dead center of the piston 68.

In FIG. 10A, the dashed line L1 shows the remaining volume (L1) of uncombusted hydrocarbons that is seen when no subsequent injection is performed (main injection only, comparative example). A dot Da, connected by a solid line, shows the remaining volume (hereafter Da) of uncombusted hydrocarbons that is seen when the subsequent injection is performed in the example 1. A dot Db, connected by a dashed line, shows the remaining volume (hereafter Db) of uncombusted hydrocarbons that is seen when the subsequent injection is performed in the example 2. A dot Dc, connected by a single dotted line, shows the remaining volume (hereafter Dc) of uncombusted hydrocarbons that is seen when the subsequent injection is performed in the example 3.

In FIG. 10B, the dashed line L2 shows the generated volume (hereafter L2) of nitrogen oxides that is seen when no subsequent injection is performed (main injection only, comparative example). A dot DA connected by a solid line shows the generated volume (hereafter DA) of nitrogen oxides that is seen when the subsequent injection is performed in the example 1. A dot DB connected by a dashed line shows the generated volume (hereafter DB) of nitrogen oxides that is seen when the subsequent injection is performed in the example 2. The dots DC connected by a single dotted line shows the generated volume (hereafter DC) of nitrogen oxides that is seen when the subsequent injection is performed in the example 3.

As shown in FIGS. 10A and 10B, in each of the examples 1 to 3, the subsequent injection was performed at crank angles of 30°, 50°, 70°, and 90°. In the example 1 (remaining volume Da, generated volume DA), the injection volume of the subsequent injection was "20 mm$^3$". In the example 2 (remaining volume Db, generated volume DB), the injection volume of the subsequent injection was "40 mm$^3$". In the example 3 (remaining volume Dc, generated volume DC), the injection volume of the subsequent injection was "60 mm$^3$". In examples 1 to 3 and the Comparative example, the mixed gas supplied to the combustion chamber 71 was in an effective lean state. Specifically, $\lambda$=about 1.81. In the examples 1 to 3 and the comparative example, the specified range of the air excess ratio $\lambda$ that defines the effective lean state shows between 1.80 and 2.00, both inclusive.

As shown in FIG. 10A, in the examples 1 to 3, the remaining volumes Da to Dc of uncombusted hydrocarbons that are seen when the subsequent injection is performed were less than the remaining volume L1 of uncombusted hydrocarbons (comparative example) that is seen when the subsequent injection is not performed. In particular, in the examples 1 to 3, the larger the crank angle at which the subsequent injection is performed, the smaller the remaining volumes Da to Dc of uncombusted hydrocarbons. In other words, in the examples 1 to 3, the later the timing of the subsequent injection after the flame propagation after the ignition of the gas fuel was ended, the smaller the remaining volumes Da to Dc of uncombusted hydrocarbons. From the examples 1 to 3, the larger the injection volume of the subsequent injection, the smaller the remaining volumes Da to Dc of uncombusted hydrocarbons.

As shown in FIG. 10B, in examples 1 to 3, the generated volumes DA to DC of nitrogen oxides that are seen when the subsequent injection is performed were less than the generated volume L2 of nitrogen oxides (Comparative example) when the subsequent injection was not performed. In particular, in the examples 1 to 3, the smaller the crank angle at which the subsequent injection is performed, the smaller the generated volumes DA to DC of nitrogen oxides. In other words, in the examples 1 to 3, the earlier the timing of the subsequent injection after the flame propagation after the ignition of the gas fuel is ended, the smaller the generated volumes DA to DC of nitrogen oxides. From the examples 1 to 3, the larger the injection volume of the subsequent injection, the less the generated volumes DA to DC of nitrogen oxides.

As shown in FIGS. 10A and 10B above, in the examples 1 to 3, the remaining volumes Da to Dc of uncombusted hydrocarbons and the generated volumes DA to DC of nitrogen oxides could be reduced compared to the comparative example. In the example 1, the larger the reduction width (=L1–Da) of the remaining volume Da of uncombusted hydrocarbons, the smaller the reduction width (=L2–DA) of the generated volume DA of nitrogen oxides. In the example 1, the larger the reduction width of the generated volume DA of nitrogen oxides, the smaller the reduction width of the remaining volume Da of uncombusted hydrocarbons. These points were also true for the examples 2 and 3.

Next, referring to FIG. 10 continuously, examples 4 to 6 different in air excess ratio $\lambda$ from examples 1 to 3 are described.

In FIG. 10A, a dot da shown by a white circle shows the remaining volume (hereafter da) of uncombusted hydrocarbons that is seen when the subsequent injection is performed in the example 4. A dot db shown by a white triangle shows the remaining volume (hereafter db) of uncombusted hydrocarbons that is seen when the subsequent injection is performed in the example 5. The dot dc shown as a white square shows the remaining volume (hereafter dc) of uncombusted hydrocarbons that is seen when the subsequent injection is performed in the example 6.

In FIG. 10B, a dot dA shown by a white circle shows the generated volume (hereafter dA) of nitrogen oxides that is seen when the subsequent injection is performed in the example 4. A dot dB shown by a white triangle shows the generated volume (hereafter dB) of nitrogen oxides that is seen when the subsequent injection is performed in the example 5. A dot dC shown in a white square shows the generated volume (hereafter dC) of nitrogen oxides that is seen when the subsequent injection is performed in the example 6.

As shown in FIGS. 10A and 10B, in the examples 4 to 6 (remaining volumes da to dc, and generated volumes dA to dC), the subsequent injection was performed at the crank angle of 30°. In the examples 4 to 6, the mixed gas supplied to the combustion chamber 71 was in a lean state richer than the effective lean state. Specifically, $\lambda$=1.76. In the examples 4 to 6, the specified range of the air excess ratio $\lambda$ that defines the effective lean state shows between 1.80 and 2.00, both inclusive. The lean state shows a state where the air excess ratio $\lambda$ is greater than "1". Other conditions in the example 4 were the same as in the example 1, other conditions in the example 5 were the same as in the example 2, and other conditions in the example 6 were the same as in the example 3.

As shown in FIG. 10A, as a result of the comparison between the examples 4 to 6 (remaining volumes da to dc) and the examples 1 to 3 (remaining volumes Da to Dc) at the same crank angle (=30 degrees), the remaining volumes da to dc of uncombusted hydrocarbons in "the lean state richer than the effective lean state" were less than the remaining volumes Da to Dc of uncombusted hydrocarbons in the effective lean state. In other words, reducing the air excess ratio λ (air-fuel ratio) reduced the remaining volumes da to dc of uncombusted hydrocarbons.

As shown in FIG. 10B, as a result of the comparison between the examples 4 to 6 (generated volumes dA to dC) and the examples 1 to 3 (generated volumes DA to DC) at the same crank angle (=30 degrees), the generated volumes dA to dC of nitrogen oxides in "the lean state richer than the effective lean state" were more than the generated volumes DA to DC of nitrogen oxides in the effective lean state. In other words, reducing the air excess ratio λ (air-fuel ratio) increased the generated volumes dA to dC of nitrogen oxides.

The embodiments and examples of the present invention have been described with reference to the drawings. However, the present invention is not limited to the embodiments and the examples described above, and can be performed in various aspects in a range without departing from its spirit. The plurality of components disclosed in the above embodiments may be modified as appropriate. For example, one of all the components shown in one embodiment may be added to the other embodiment or some components of all the components shown in one embodiment may be removed from the embodiment.

The drawings schematically show each component as a main subject as so to facilitate understanding of the present invention, and the thickness, length, quantity, spacing, and so on of each shown component is, as the case may be, different from the actual ones due to the convenience of the drawings. Further, it is needless to say that the configuration of each component shown in the above embodiments is merely an example and is not particularly limited, and various modifications may be made without substantially departing from the effect of the present invention.

The engine system 100 described with reference to FIG. 1 had only a gas fuel mode. The gas fuel mode is a mode in which mechanical work is obtained by combustion of gas fuel. However, the engine system 100 may have a gas fuel mode and a liquid fuel mode. The liquid fuel mode is a mode in which mechanical work is obtained by combustion of liquid fuel. In this case, in addition to the liquid fuel injecting unit 66 that injects liquid fuel for ignition, the engine system 100 is equipped with another liquid fuel injecting unit that injects, to the combustion chamber 71, the liquid fuel for obtaining mechanical work through combustion. The engine system 100 may also have a mixed combustion mode. The mixed combustion mode is a mode in which both gaseous fuel and liquid fuel are combusted at substantially the same time thereby to obtain mechanical work.

INDUSTRIAL APPLICABILITY

The present invention relates to an engine system and a gas fuel combustion method, and has industrial applicability.

REFERENCE SIGNS LIST 1 engine
21 engine control unit
25 measuring unit
65 gas fuel supply unit
66 liquid fuel injecting unit
68 piston
71 combustion chamber
100 engine system
211 control unit

The invention claimed is:

1. An engine system that has a combustion chamber to which air and a gas fuel are supplied, and the engine system being configured to combust the gas fuel, the engine system comprising:
a liquid fuel injecting unit configured to inject a liquid fuel into the combustion chamber in association with ignition of the gas fuel; and
a control unit configured to control the liquid fuel injecting unit, and
wherein the control unit is configured to control the liquid fuel injecting unit to perform injection of the liquid fuel after an end of a flame propagation, the flame propagation based on ignition of the gas fuel.

2. The engine system according to claim 1, wherein the control unit is configured to control the liquid fuel injecting unit to start the injection of the liquid fuel within a first half of a combustion time period of the gas fuel.

3. The engine system according to claim 1, wherein:
a plurality of combustion cycles are performed in a predetermined period,
the liquid fuel injecting unit is configured to, for each combustion cycle of the plurality of combustion cycles, perform the injection of the liquid fuel after the end of the flame propagation, and
the control unit is configured to, within the predetermined period, prohibit an increase in an injection volume of the liquid fuel that would otherwise occur based on the ignition of the gas fuel.

4. The engine system according to claim 3, wherein:
the increase in the injection volume of the liquid fuel that is prohibited would otherwise occur according to an increase in a load on an engine, and
the predetermined period is 10 seconds.

5. The engine system according to claim 1, further comprising:
a measuring unit configured to measure a physical quantity that directly or indirectly shows an exhaust substance generated based on combustion of the gas fuel, and
wherein the control unit is configured to, based on a measurement result by the measuring unit, control the injection of the liquid fuel after the end of the flame propagation.

6. The engine system according to claim 1, wherein the control unit is configured to control an air excess ratio in the combustion chamber according to a condition when the liquid fuel is injected after the end of the flame propagation.

7. The engine system according to claim 1, further comprising:
a piston configured to move in the combustion chamber, wherein an injection angle of the liquid fuel relative to a direction of movement of the piston is between 30 degrees and 65 degrees, both inclusive.

8. The engine system according to claim 1, wherein the control unit is configured to control the liquid fuel injecting unit so that the injection of the liquid fuel after the end of the flame propagation is performed after a top dead center of a piston and at a crank angle in a range of 30 degrees or more and less than 60 degrees.

9. The engine system according to claim 1, wherein the control unit is configured to change at least one of following:
a number of injecting operations of the liquid fuel after the end of flame propagation,
an injection volume of the liquid fuel after the end of the flame propagation, or an injection timing of the liquid fuel after the end of the flame propagation, and thereby, adjust a volume of an exhaust substance from an engine.

10. A gas fuel combustion method in an engine in which air and a gas fuel are supplied to a combustion chamber, the method comprising:

injecting a liquid fuel into the combustion chamber to enable ignition of the gas fuel; and performing an injection of the liquid fuel after an end of a flame propagation based on the ignition of the gas fuel.

11. The gas fuel combustion method according to claim 10, wherein the injecting of the liquid fuel after the end of the flame propagation is started within a first half of a combustion time period of the gas fuel.

12. The gas fuel combustion method according to claim 10, wherein:

a plurality of combustion cycles are performed in a predetermined period, and for each combustion cycle of the plurality of combustion cycles, the injection of the liquid fuel after the end of the flame propagation is performed, and the method further includes prohibiting, within the predetermined period, an increase in an injection volume of the liquid fuel that would otherwise occur based on ignition of the gas fuel.

13. The gas fuel combustion method according to claim 12, wherein:

the increase in the injection volume of the liquid fuel that is prohibited would otherwise occur according to an increase in a load on the engine, and the predetermined period is 10 seconds.

14. The gas fuel combustion method according to claim 10, wherein the injection of the liquid fuel after the end of the flame propagation is performed after a top dead center of a piston and at a crank angle in a range of 30 degrees or more and less than 60 degrees.

15. The gas fuel combustion method according to claim 10, further comprising, changing:

a number of injecting operations of the liquid fuel after the end of flame propagation, an injection volume of the liquid fuel after the end of the flame propagation, or an injection timing of the liquid fuel after the end of the flame propagation, and thereby, a volume of an exhaust substance from the engine is adjusted.

16. The gas fuel combustion method according to claim 10, further comprising changing a number of injecting operations, after the end of flame propagation, of the liquid fuel to be performed.

17. The gas fuel combustion method according to claim 10, further comprising changing an injection volume of the liquid fuel to be injected into the combustion chamber, the injection volume of the liquid fuel to be injected into the combustion chamber after the end of the flame propagation.

18. The gas fuel combustion method according to claim 10, further comprising changing an injection timing of the liquid fuel to be injected into the combustion chamber after the end of the flame propagation.

19. A gas fuel combustion method in an engine, the method comprising:

during a single combustion cycle:

supplying air and a gas fuel to a combustion chamber;

igniting the gas fuel supplied to the combustion chamber, wherein ignition of at least the gas fuel produces a flame; and after propagation of the flame, injecting a liquid fuel into the combustion chamber, the liquid fuel injected into the combustion chamber during a combustion time period of combustion of the gas fuel in the combustion chamber.

20. The gas fuel combustion method according to claim 19, further comprising:

during the single combustion cycle, injecting the liquid fuel into the combustion chamber to induce ignition of the gas fuel, and wherein the liquid fuel injected into the combustion chamber after propagation of the flame and during the combustion time period is injected:

after a top dead center of a piston, at a crank angle of greater than or equal to 10 degrees, at a crank angle of less than or equal to 65 degrees, during a first half of the combustion time period, or a combination thereof.

* * * * *